United States Patent [19]

Hart

[11] 4,058,052
[45] Nov. 15, 1977

[54] COOKING GRILL AND BRIQUETTES THEREFOR

[76] Inventor: Mark M. Hart, 37 Huntleigh Woods, St. Louis, Mo. 63131

[21] Appl. No.: 176,088

[22] Filed: Aug. 30, 1971

[51] Int. Cl.² .............................................. A23P 1/00
[52] U.S. Cl. .................................... 99/646 R; 44/6
[58] Field of Search ............... 99/646, 340, 427, 445, 99/446, 447, 450; 29/183, 195, 182.5, 183, 192; 126/39 E, 39 J, 41, 92 R, 92 AC, 92 B, 41–42; 161/7, 224, 411; 44/6, 10, 14; 75/20 F; 425/237–403, 801

[56] References Cited

U.S. PATENT DOCUMENTS

| 738,136 | 9/1903 | White | 44/14 X |
|---|---|---|---|
| 2,263,792 | 11/1941 | Wood | 161/7 |
| 2,362,972 | 11/1944 | Brownback | 126/39 J UX |
| 2,790,434 | 4/1957 | Del Francia | 99/446 UX |
| 2,948,594 | 8/1960 | Doyle | 44/6 |
| 3,086,449 | 4/1963 | Cahill | 99/446 |
| 3,241,542 | 3/1966 | Lotter | 126/39 J |
| 3,300,815 | 1/1967 | Rohaus et al. | 425/237 |
| 3,338,156 | 8/1967 | Angelos | 99/427 |
| 3,369,481 | 2/1968 | Pappas | 99/445 |
| 3,444,805 | 5/1969 | Happel et al. | 99/340 |
| 3,450,529 | 6/1969 | MacDonald | 425/237 X |
| 3,473,900 | 10/1969 | Sara | 29/195 |
| 3,487,199 | 12/1969 | Hamlin | 99/446 X |
| 3,527,580 | 9/1970 | Bonlie | 44/6 X |
| D. 88,351 | 11/1932 | Herrly | 44/14 X |

FOREIGN PATENT DOCUMENTS

| 142,359 | 5/1920 | Australia | 126/39 J |
|---|---|---|---|
| 234,992 | 6/1925 | United Kingdom | 126/39 J |

*Primary Examiner*—Stanley N. Gilreath
*Assistant Examiner*—Arthur O. Henderson
*Attorney, Agent, or Firm*—Polster, Polster and Lucchesi

[57] ABSTRACT

In a grill for cooking, of the type popularly used for outdoor barbequeing, wherein a gas flame is used as a heat source, a meat support is provided, and a grizzly is positioned between the heat source and the meat support, on which grizzly non-flamable "briquettes" are scattered, a plurality of aluminum briquettes are used, arranged in spaced relation to one another through at least a part of their perimeter, so as to provide a plurality of heat-communicating channels between the heat source and the meat support. The aluminum briquettes are preferably provided with a broad convex surface which for high heats is oriented toward the meat support, which surface is provided with liquid-retaining means, in the form of channels, pits or the like. A broad flat surface is preferably provided to be oriented toward the meat support for cooking at lower heats, the flat face preferably being provided with distributing channels.

2 Claims, 4 Drawing Figures

INVENTOR:

MARK M. HART

BY:

COOKING GRILL AND BRIQUETTES THEREFOR

BACKGROUND OF THIS INVENTION

This invention relates to grills for cooking meat, and has particular application and will be described as applied to gas-fired grills, although it can also be used in grills in which a heavy electric element is the source of heat, or in which liquid fuels are used.

In gas-fired outdoor grills known heretofore, it has been common to use, as a means for distributing heat and providing the "charcoal-flavored" taste of meat cooked over a bed of coals, a bed of porous rocks, in the nature of pumice, upon which fat and juices from the meat drip, are charred and vaporized and rise again to flavor the meat. In practice, the porosity of the rocks makes them poor conductors of heat, which makes the arrangement inefficient. it also leads to a soaking up of the fat, and, thereafter, to a flashing of the fat and its burning. If the burning fat is not quenched, it continues to burn for a substantial length of time, because the rock is saturated with fat.

One of the objects of this invention is to provide a grill arrangement which is more efficient than gas fired and similar grills known heretofore.

Another object is to provide such an efficient arrangement in which the meat being cooked is given the desired flavor.

Still another object is to provide such a grill in which either no grease fires occur, or, if they do occur, are of a very short duration and are self extinguishing.

Other objects will become apparent to those skilled in the art in the light of the following description and accompanying drawings.

SUMMARY OF THE INVENTION

In accordance with this invention, generally stated, in a grill for cooking meat, having a heat source, a grizzly above said heat source, and a meat support above said grizzly, a plurality of aluminum briquettes is provided, supported by the grizzly in vertically spaced relation to the meat support and in spaced relation, through at least a part of each of their perimeters, from one another, so as to provide a plurality of heat-communicating channels between the heat source and the meat support. Preferably the aluminum briquettes have at least one convex surface, oriented toward the heat support, and provided with liquid retaining means, such as pits or annular channels or dams. In the preferred embodiment, the briquettes are cylindrical in plan view, convex on one broad surface and flat, though grooved in a rectilinear pattern, on the other and in use, have a coating of char on at least the surface facing the meat support.

DESCRIPTION OF PREFERRED EMBODIMENT

Figure 1:
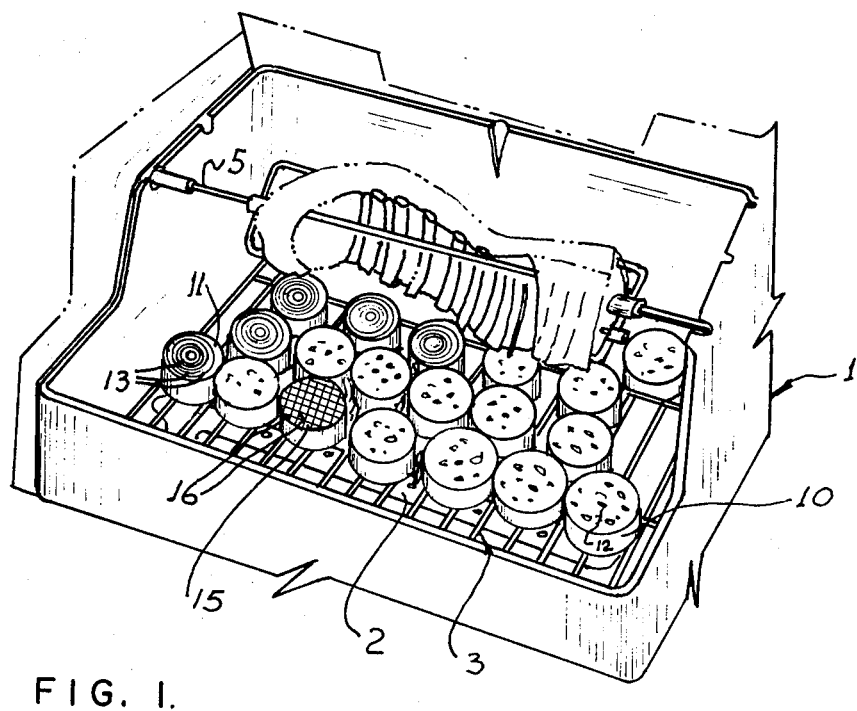
FIG. 1 is a fragmentary view in perspective of a gas-fired outdoor grill, conventional in every respect except in the provision of aluminum briquettes of this invention.

Referring now to the drawing, particularly to FIG. 1, for one illustrative embodiment of grill arrangement and aluminum briquette of this invention, reference numeral 1 indicates an outdoor grill conventional in every respect except in the provision of aluminum briquettes 10 of this invention. The grill 1 has a gas burner 2, a grizzly 3, above the gas burner, and a meat support 5, in the illustration, a spit, above the grizzly. The meat support can, of course, be a rack or grid.

Aluminum briquettes 10 rest upon and are supported by the grizzly 3. The aluminum briquettes 10 are cylindrical in plan, and, while most of them touch at least one other briquette, are, of necessity, spaced through much of their periphery from one another. The spacing of the aluminum briquettes 10, provides a plurality of heat-communicating channels, between the heat source and the meat support. At the same time, the major portion of the area between the heat source and the meat support is covered by the briquettes 10.

In the embodiment of briquettes shown in FIG. 1, a "top" surface 11 is crowned and provided with annular concentric channels 13, and a "bottom" surface 15 is flat. The surface of each oriented toward the meat support, is covered with char 12. The bottom surface 15 is preferably scored in a rectilinear pattern, with channels 16.

Figure 2:
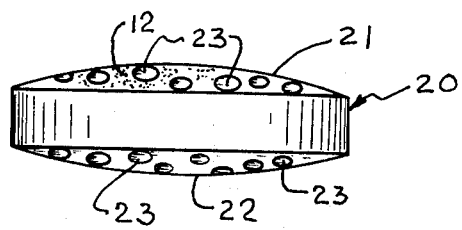
FIG. 2 is a view in side elevation of another embodiment of aluminum briquette of this invention.
Figure 4:
FIG. 4 is a sectional view taken along the line 4—4 of FIG. 3.
Figure 3:
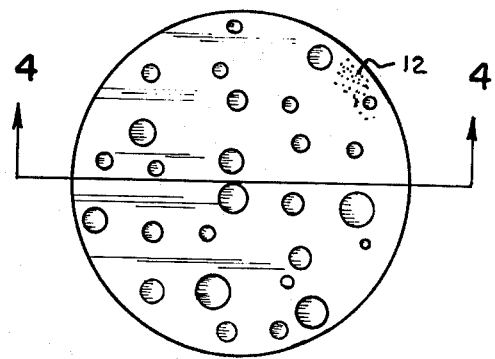
FIG. 3 is a top plan view of the briquette shown in FIG. 2.

Referring now to FIG. 2, 3 and 4 for another embodiment of aluminum briquette of this invention, the briquette is indicated by reference numeral 20. The briquette 20 is cylindrical or circular in plan, as shown in FIG. 3, and has identical upper and lower surfaces 21 and 22, both of which are convex. Each of the surfaces 21 and 22 is provided with a multiplicity of pits 23, which serve as liquid-retaining means. In the illustrative embodiment shown, both surface 21 and surface 22 are provided with a char layer 12 although the char is illustrated on only the top surface in the drawing.

Both embodiments of aluminum briquettes of this invention illustrated, are of substantial diameter and thickness. Merely by way of illustration, and not by way of limitation, solid aluminum briquettes two inches in diameter and one inch from top to bottom have been found quite suitable. In the embodiment shown in FIG. 1, the crowning is such that the briquettes are approximately one third of an inch thicker at their centers than at their peripheries. The annular channels 13 are approximately one sixteenth of an inch deep and one sixteenth of an inch wide. The outermost of the channels is spaced approximately one sixteenth of an inch from the edge of the briquette and the channels are approximately one-fourth of an inch apart, center to center. The bottom surface 15 is scored with channels 16 approximately one sixteenth of an inch wide and deep forming quarter inch squares.

In the embodiment shown in FIGS. 2-4, both top and bottom surfaces are crowned about one third of an inch, and the pits or dimples, shown as being of somewhat random distribution and diameter, can be about one sixteenth of an inch deep.

In operation, the aluminum briquettes 10 or 20, being excellent conductors of heat, convey the heat from the heat source to the meat to be cooked. When the convex surfaces of the briquettes are oriented toward the meat support, fat and the juices from the meat drip on the upwardly facing surfaces of the briquettes, and are there observed to boil and vaporize and char to some extent, but not to burn. The vapors are transmitted to the meat to give it the desired flavor. Fat which falls into the flame from the heat source, or upon the heat source if it be an electric element, is instantly consumed. If, particularly in the case of the flat faced briquettes 10, some grease should flash on the surface of the briquette, it is consumed quickly, and does not require the application of water or other quenching means.

For cooking at a relatively low temperature, it is preferable, in the embodiment shown in FIG. 1, to turn the flat faces of the briquettes toward the meat support. The linear channels 16 tend to distribute the grease and juices over the entire flat face of the briquette, and to produce the desired vapor without flashing. However, when it is desired to use a very high cooking heat without flaming of grease, the convex face of the briquettes is turned toward the meat support, because the likelihood of flaming of the grease is then largely eliminated.

If it is found that the distribution of heat from the source itself is not uniform, briquettes with an upwardly facing convex surface can be used over the hot spots or areas, and briquettes with flat surfaces facing upwardly, in cooler areas, to accommodate the deficiencies of the source.

In the embodiment of briquettes in which the broad surfaces are convex, it has been found that no flashing of the fat into flame occurs even at high heat. Where some flashing is desired, therefore, a flat or other configuration should be used. If deep pits or dams or concave surfaces are used, flashing will occur, though the flame will be limited to the amount of combustible material retained on the surface of the briquette.

The char, essentially a layer of carbon, can be applied to the briquettes before they are used for cooking, or the char can be put on by the natural action of the grease and juices of the meat when the briquettes are first used. In the latter case, the initial operation of the briquettes will not be quite as satisfactory as their operation when a carbonized layer has been formed on the surface of the briquette facing the meat support. The layer of char is found to be largely self-regulating, in that if a thick layer builds up it or a portion of it will vaporize or will separate itself from the surface of the briquette. The char layer of the briquettes which are not generally below the meat eventually is removed by the flame or heat source.

It has been found that a smooth convex surface makes it difficult to obtain the desired char layer. Accordingly, some liquid retaining means, such as the pits 23 or channels 13, should be provided. The means may take other forms, such as ribs, serations, or the like, none of which need be any deeper or thicker as the case may be than is necessary to permit a char layer to start to form, because, once started, the char layer will tend to form over the entire top surface. Channels 13 have been found to help distribute the grease and other liquids containing char-forming matter uniformly over the surface of the briquette, as do the channels 16 on the flat side.

While the preferred embodiment of aluminum briquette is made of solid aluminum, such as bar stock or cast aluminum, foamed aluminum or blocks of thoroughly secured aluminum chips may also be used. The foamed aluminum, unlike the porous pumice, will not absorb grease, the pores being non-communicating, and the pores which are open over the top surface only serve the function of the pits in the solid form.

While the preferred embodiment of briquette of this invention is cylindrical in plan, other shapes may be used, such, for example as a pillow shape to resemble charcoal briquettes, or a free-form somewhat triangular shape, so long as they do not form a solid mass over the heat source, but provide heat-communicating channels between them.

The depth of the liquid-retaining means can be varied for particular applications. In the double-convex type of briquette, for example, dimples or channels on the two sides can be of different depths to provide greater versatility in use.

Numerous variations in the construction of the briquettes of this invention, and their arrangement in a grill assembly, within the scope of the appended claims, will occur to those skilled in the art in the light of the foregoing disclosure.

Having thus described the invention, what is claimed and desired to be secured by Letters Patent is:

1. A solid liquid impervious aluminum briquette having two, oppositely disposed, convex surfaces having liquid retaining means thereon, and a coating of char on at least one of said surfaces.

2. A solid liquid impervious aluminum briquette having a broad convex surface with liquid retaining means thereon and a broad flat surface with liquid-distributing channels in it.

* * * * *